(12) United States Patent　(10) Patent No.: US 8,078,567 B1
Cadick et al.　(45) Date of Patent: Dec. 13, 2011

(54) SYSTEM AND METHOD FOR CONDITION BASED MAINTENANCE FOR ELECTRICAL EQUIPMENT

(76) Inventors: John Cadick, Garland, TX (US);
Gabrielle Traugott, Austin, TX (US);
M. Shane Garonzik, Austin, TX (US)

(*) Notice: Subject to any disclaimer, the term of this patent is extended or adjusted under 35 U.S.C. 154(b) by 572 days.

(21) Appl. No.: 12/347,259

(22) Filed: Dec. 31, 2008

(51) Int. Cl.
*G06F 9/44* (2006.01)
*G06N 7/02* (2006.01)
*G06N 7/06* (2006.01)

(52) U.S. Cl. .......................................................... 706/52
(58) Field of Classification Search ................... 706/52
See application file for complete search history.

(56) References Cited

U.S. PATENT DOCUMENTS

| | | | | |
|---|---|---|---|---|
| 7,020,571 | B2 * | 3/2006 | Lee .............................. | 702/119 |
| 7,096,141 | B2 * | 8/2006 | Bohan ........................... | 702/122 |
| 7,120,552 | B1 * | 10/2006 | Scherf et al. .................. | 702/119 |
| 7,574,318 | B2 * | 8/2009 | Hsieh ............................. | 702/108 |
| 7,657,790 | B2 * | 2/2010 | Whetsel ........................ | 714/27 |
| 7,984,331 | B2 * | 7/2011 | Whetsel ........................ | 714/27 |
| 8,005,633 | B2 * | 8/2011 | Barford et al. ................. | 702/76 |

OTHER PUBLICATIONS

Low-Voltage Distribution Network Theoretical Line Loss Calculation System Based on Dynamic Unbalance in Three Phrases, Ni Feng; Yu Jianming; Electrical and Control Engineering (ICECE), 2010 International Conference on Digital Object Identifier: 10.1109/iCECE.2010.1290 Publication Year: 2010 , pp. 5313-5316.*

Real-time emulation for power equipment development. II. The virtual machine, Slater, H.J.; Atkinson, D.J.; Jack, A.G.; Electric Power Applications, IEE Proceedings—vol. 145 , Issue: 3 Digital Object Identifier: 10.1049/ip-epa:19981849 Publication Year: 1998 , pp. 153-158.*

Syntactic Decision Rules for Recognition of Spoken Words and Phrases Using a Stochastic Automaton, Kashyap, R. L.; Pattern Analysis and Machine Intelligence, IEEE Transactions on vol. PAMI-1 , Issue: 2 Digital Object Identifier: 10.1109/TPAMI.1979. 4766901 Publication Year: 1979 , pp. 154-163.*

Speech activated telephony email reader (SATER) based on speaker verification and text-to-speech conversion, Chung-Hsien Wu; Jau-Hung Chen; Consumer Electronics, IEEE Transactions on vol. 43 , Issue: 3 Digital Object Identifier: 10.1109/30.628698 Publication Year: 1997 , pp. 707-716.*

Al Rose, Reliability Centered Maintenance, Technical Bulletin 014, Aug. 1, 2002.

John Cadick, P.E., Conditioned Based Maintenance . . . How to get started . . . 1996.

Mike DiLeo et al., Condition Based Maintenance, Oct. 1999.

(Continued)

*Primary Examiner* — Michael B Holmes
(74) *Attorney, Agent, or Firm* — Howison & Arnott, L.L.P.

(57) ABSTRACT

Provided are a system and method for condition based maintenance of electrical devices. In one example, the method includes receiving test data that represents an attribute of a tested electrical device. The received test data is classified as belonging to a client and added to a control set representing an aggregate of information from many clients. The received test data is processed using a sparse data process if the attribute is represented by two sets of test data, and is processed using an autoregressive process if the attribute is represented by three or more sets of test data. Both the sparse data process and the autoregressive process may use information from the client and the control set. A future value of the attribute is predicted based on the processing, and at least a representation of the future value is output.

26 Claims, 11 Drawing Sheets

OTHER PUBLICATIONS

Transformer Oil Analyst 3.3 Product Specification, Delta-X Research, Jul. 30, 2003.

Curtis Gary Dean, FCAS, MAAA, Education and Examination Committed of the Society of Actuaries, Construction and Evaluation of Actuarial Models Study Note, Topics in Credibility Theory, 2005.

Zhenyuan Wang, Artificial Intelligence Applications in the Diagnosis of Power Transformer Incipient Faults, Dissertation submitted to the Faculty of the Virginia Polytechnic Institute and State University, Aug. 8, 2008.

* cited by examiner

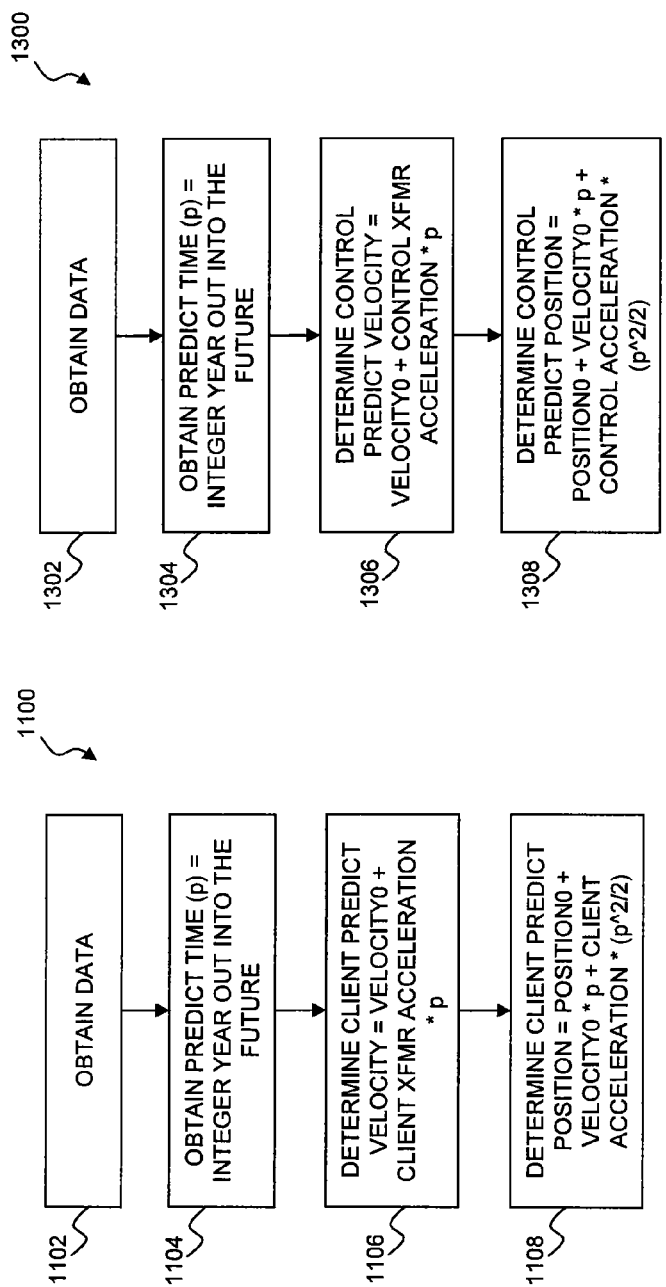

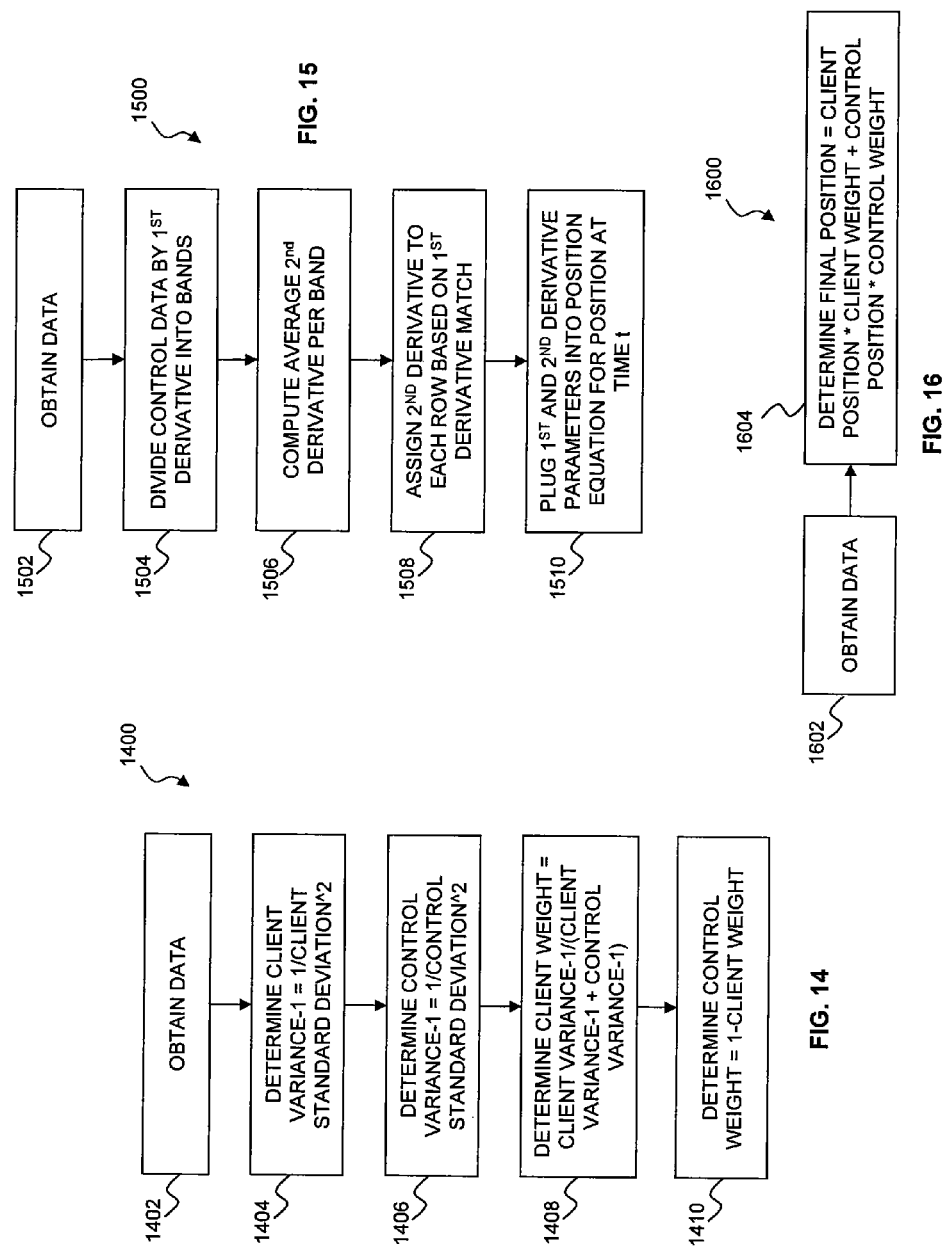

SYSTEM AND METHOD FOR CONDITION BASED MAINTENANCE FOR ELECTRICAL EQUIPMENT

BACKGROUND

Equipment maintenance has become an increasingly important aspect of many businesses. Such maintenance has traditionally been categorized in various ways, such as breakdown maintenance, preventive maintenance, predictive maintenance, and condition based maintenance.

Breakdown maintenance typically involves allowing equipment to run until it breaks, often with the assumption that the outage and repair costs will be less than a maintenance program. Preventive maintenance typically involves a calendar-based program that uses a piece of equipment's time off-line to run comprehensive tests on the equipment. Predictive maintenance uses known cause/symptom/effect relationships for a piece of equipment in order to predict the need for corrective action. Traditional condition based maintenance uses an approach that is similar to predictive maintenance, but enables scheduled maintenance to be skipped entirely if justified by the equipment's test results. Although each type of maintenance has its place, breakdown maintenance, preventive maintenance, predictive maintenance, and traditional condition based maintenance all fail to adequately address the efficient provision of maintenance services to electrical equipment.

Accordingly, what is needed are a system and method to address the current deficiencies in the maintenance of electrical equipment.

SUMMARY

In one embodiment, a method is provided. The method comprises receiving, by a system, test data representing an attribute of a tested electrical device, wherein the received test data is associated with a test date on which the test data was obtained from the tested electrical device. The received test data is classified as belonging to a first client of a plurality of clients and adding the received test data to a control set representing an aggregate of information of the plurality of clients. The method determines whether the attribute of the tested electrical device is represented in the system by only the received test data, by only two sets of test data that include the received test data and stored test data corresponding to the attribute from at least one previous test performed on the tested electrical device, or by three or more sets of test data that include the received test data and stored test data corresponding to the attribute from at least two previous tests performed on the tested electrical device. The received test data is stored if the attribute is represented in the system by only the received test data, wherein the received test data is not processed. The received test data is processed using a sparse data process if the attribute is represented in the system by two sets of test data. The received test data is processed using an autoregressive process if the attribute is represented in the system by three or more sets of test data. A future value of the attribute is predicted based on the processing by one of the sparse data process and the autoregressive process, and at least a representation of the future value is output.

In another embodiment, a method is provided. The method comprises receiving, by a system, test data representing an attribute of a tested electrical device, wherein the received test data is associated with a test date on which the test data was obtained from the tested electrical device. The method determines a difference between the received test data and stored test data corresponding to the attribute from at least one previous test conducted on a preceding test date, and determines whether the difference exceeds a defined threshold. A new designation is assigned within the system to the tested electrical device if the difference exceeds the defined threshold, wherein the new designation is used by the system to differentiate between a first state of the tested electrical device before obtaining the received test data and a second state of the tested electrical device after obtaining the received test data. The received test data is processed using one of a sparse data process and an autoregressive process to obtain a first derivative and a second derivative representing the received test data. A probable future position of the attribute relative to control information representing information corresponding to the attribute for a plurality of electrical devices is determined, wherein the determination is based on the first derivative and the second derivative. At least a representation of the probable future position is output.

In still another embodiment, a system is provided. The system comprises a database having client information and control information stored therein, wherein the client information includes a separate client class containing data corresponding to each of a plurality of clients and the control information includes at least one control class containing data corresponding to a combination of the plurality of clients. The system also comprises a computing device having a processor coupled to the database, a memory coupled to the processor, and a plurality of instructions stored in the memory and executable by the processor. The instructions include instructions for receiving, by the system, test data representing an attribute of a tested electrical device, and classifying the received test data as belonging to a first client of the plurality of clients, adding the received data to the first client's client class, and adding the received test data to the control class. The instructions also include instructions for processing the received test data using one of a sparse data process and an autoregressive process to obtain a first derivative and a second derivative representing the received test data, and determining a position of the attribute relative to control information representing information corresponding to the attribute for a plurality of electrical devices, wherein the determining is based on the first derivative and the second derivative. The instructions also include instructions for outputting at least a representation of a future value of the position.

BRIEF DESCRIPTION OF THE DRAWINGS

For a more complete understanding, reference is now made to the following description taken in conjunction with the accompanying Drawings.

FIGS. 8-16 are flowcharts illustrating various embodiments of methods that may be used by the data analysis component of FIG. 7.

DETAILED DESCRIPTION

Figure 1:
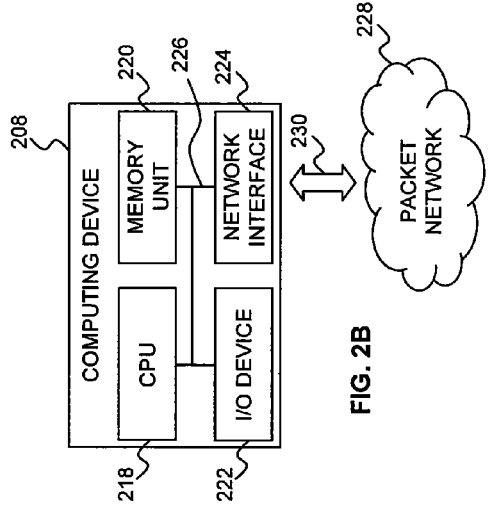
FIG. 1 is a flow chart illustrating one embodiment of a condition based maintenance method.

Referring now to the drawings, wherein like reference numbers are used herein to designate like elements throughout, the various views and embodiments of a system and method for condition based maintenance for electrical equipment is illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, one embodiment of a method 100 is illustrated. As will be described in greater detail below, the method 100 applies actuarial principles to determine equipment maintenance schedules, issue warnings regarding equipment condition, and provide other information regarding tested equipment, such as the probability of failure over a certain time period. Accordingly, test results data is obtained in step 102. The data may vary based on equipment type, but is directed to electrical equipment (e.g., transformers) in the present example and so contains test values specific to that type of equipment. The data may be in the form of raw test results (e.g., actual measured values) or may be preprocessed to ensure that the data is formatted as desired or otherwise manipulated prior to further processing.

In step 104, the data is received for data input processing. Data input processing may perform tasks such as risk classification and data manipulation. For example, risk classification may include categorizing the data in client and control classes, while data manipulation may include maintenance restart logic to handle equipment changes that would skew test results if not addressed.

In step 106, the data is received for data analysis. In the present example, the data analysis includes multiple steps based on a second order autoregressive method. The autoregressive method is modified to perform specific analysis functions with respect to the test results data. Although a second order autoregressive model is used as the basis for the data analysis for purposes of example, it is understood that other analysis methods may be used, such as an autoregressive moving average method.

As is known, parameters of an autoregressive model may be collared to ensure that the model remains stationary (e.g., that the probability distribution does not change when shifted in time or space). Accordingly, some parameters in the following discussion may be collared by ensuring that their values do not equal or exceed a defined value (e.g., zero or one).

In step 108, the analyzed data is received for data output processing. Data output processing may use the analyzed data with actuarial life tables of electrical equipment to provide estimated equipment maintenance schedules, probability of failure over a certain time period, and similar information regarding a single piece of equipment or multiple pieces of equipment. As will be discussed below in greater detail, output information may be tailored in many different ways to produce desired information.

Figure 2A:
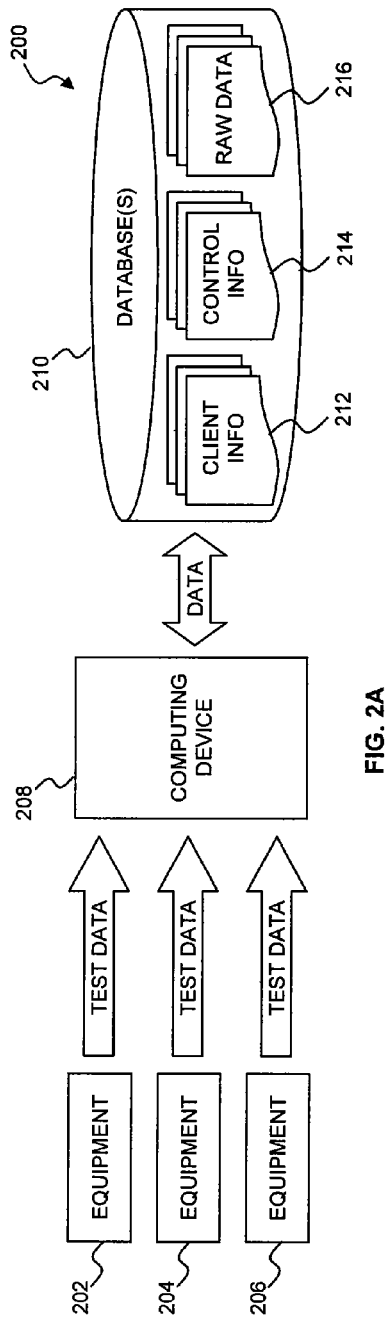
FIG. 2A is a diagram illustrating one embodiment of a system that may be used to perform at least a portion of the method of FIG. 1.

Referring to FIG. 2A, one embodiment of a system 200 that may be used to execute the method 100 of FIG. 1 is illustrated. The system 200 receives test data from equipment 202, 204, and 206, which are not part of the system. For purposes of example, the equipment 202, 204, and 206 are transformers throughout the present disclosure, although it is understood that they may represent any type of electrical equipment and need not be identical or similar to one another. Furthermore, the transformers 202, 204, and 206 may be located at a single site (e.g., in an equipment room), may be geographically distributed over a large area (e.g., states or countries), and/or may be operating in similar or different environmental conditions (e.g., temperature and humidity). The test data is entered into a computing device 208, which is coupled to or includes one or more databases 210. The database 210 includes client information 212, control information 214, and raw data 216.

The client information 212 may include information specific to a particular client and the client's equipment. For example, if the transformers 202 and 204 belong to a first client and the transformer 206 belongs to a second client, the transformers 202 and 204 would be associated with the first client in the client information 212 and the transformer 206 would be associated with the second client in the client information 212. The test results for all transformers 202, 204, and 206 (e.g., of both the first and second clients) are placed in the control information 214, which provides an aggregate information source for analysis purposes. In some embodiments, a client may only have access to the client information 212 associated with that client, but may benefit from the aggregate information provided by the control information 214 for purposes of analysis. Raw data 216 (e.g., actual values of test results) may also be stored in the database 210.

It is understood that the database 210 may represent a single database or multiple databases. For example, each of the client information 212, control information 214, and raw data 216 may be placed in a separate database, or various combinations of the information may be provided using different numbers of databases. Furthermore, the database 210 may be distributed and may be accessible via other means than the computing device 208, such as via a web server (not shown) or other communications component. In other embodiments, a web server or other communications component may access the database via the computing device 208. In still other embodiments, the computing device 208 may be a web server or contain web server functionality.

Figure 2B:
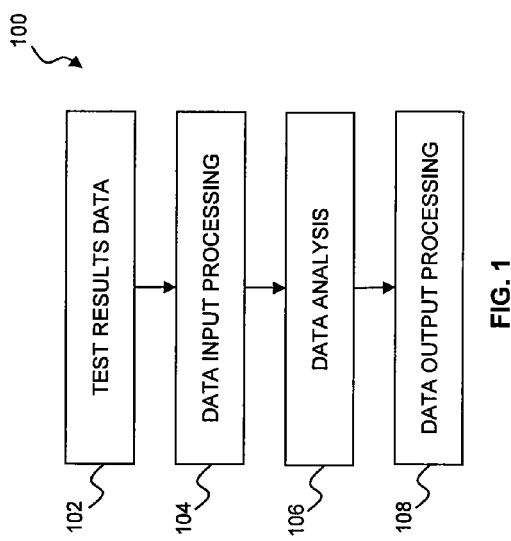
FIG. 2B is a diagram illustrating one embodiment of a computing device that may be used within the system of FIG. 2A.

With additional reference to FIG. 2B, one embodiment of the computing device 208 of FIG. 2A is illustrated. The computing device 208 may be a computer (e.g., a desktop computer, a laptop computer, or a server), personal digital assistant (PDA), cellular telephone, or any other device capable of transmitting, processing, and/or receiving signals via wireless and/or wireline communication links.

In the present embodiment, the computing device 208 is a computer that includes a central processing unit ("CPU") 218, a memory unit 220, an input/output ("I/O") device 222, and a network interface 224. The network interface may be, for example, one or more network interface cards (NICs) that are each associated with a media access control (MAC) address or may include network functionality built into a chip in the computing device 208. The components 218, 220, 224, and 226 are interconnected by one or more communication links 226 (e.g., a bus). It is understood that the computing device 208 may be differently configured and that each of the listed components may actually represent several different components. For example, the CPU 218 may actually represent a multi-processor or a distributed processing system; the memory unit 204 may include different levels of cache memory, main memory, hard disks, and remote storage locations; and the I/O device 222 may include monitors, keyboards, and the like.

The computing device 208 may be connected to a network 228 via a communications link 228 provided by the network interface 224. The network 228 may include any electronic transport medium, as well as network infrastructure needed to provide such support, such as servers and routers. The network 228 may be, for example, a local area network (LAN), a wide area network (WAN), a company wide intranet, and/or the Internet. Furthermore, the network 228 may support wireless and/or wired communications using a variety of protocols.

The memory unit 220 of the computing device 208 and/or the database 210 may include a plurality of instructions executable by the CPU 218 to perform the method 100 and other methods described herein, as well as instructions to store, process, and retrieve data and to implement data structures, such as an architecture for implementing all or portions of the present disclosure. Such instructions may also be stored on removable media, such as a compact disc (CD), digital versatile disc (DVD), flash drive, or any other type of removable media.

Figure 3:
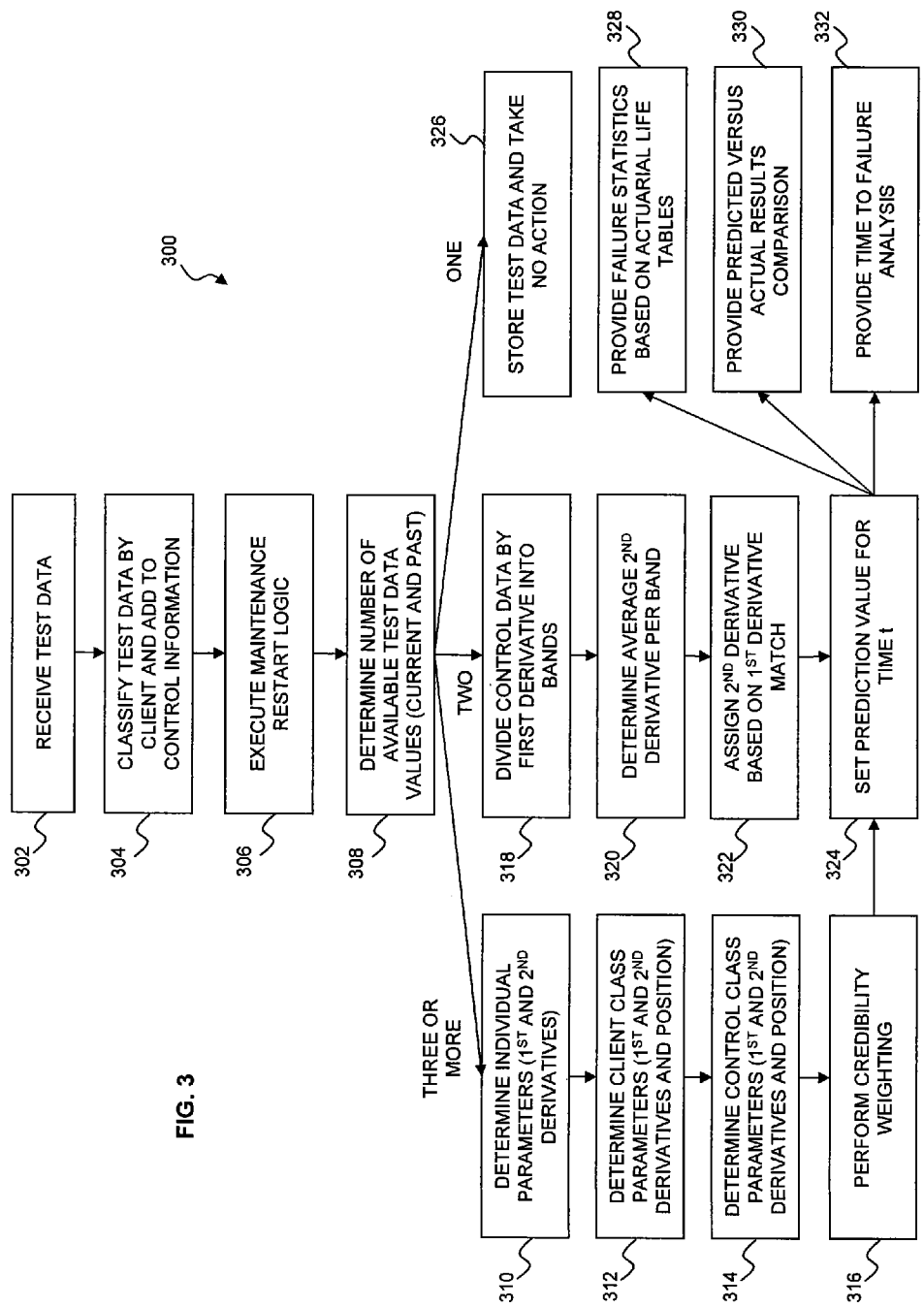
FIG. 3 is a flow chart illustrating one embodiment of a condition based maintenance method that may be used within the system of FIG. 2A.

Referring to FIG. 3, a method 300 illustrates one embodiment of the method 100 of FIG. 1 in greater detail. The method 300 may be executed on the system 200 to provide the data input processing, data analysis, and data output processing of the method 100 of FIG. 1. In the present example, steps 302-306 provide the data input processing 104, steps 308-326 provide the data analysis 106, and steps 328-332 provide the data output processing 108. It is understood that the categories of data input processing, data analysis, and data output processing are for purposes of illustration only, and that steps may be placed in different categories without altering the functionality provided by the method 300.

In step 302, test data is received by the computing device 208. For example, test data for the transformers 202 and 204 may be received. In some embodiments, the test data for the two transformers 202 and 204 may be processed together, with one or more steps being performed for both transformers prior to moving to the next step(s). In other embodiments, the test data for the transformer 202 may be entirely processed by the method 300 before the method returns and begins processing the test data for the transformer 204. In still other embodiments, one or more steps of the method 300 may be executed for each test performed on the transformer 202, with all or portions of the method 300 being executed repeatedly until the different tests are processed for a single transformer. Accordingly, steps of the method 300 may be executed in many different ways to process received test data.

In step 304, the test data is classified by client (e.g., added to the client information 212 for a particular client) and also the control information 214. In step 306, maintenance restart logic may be executed to determine whether to restart maintenance for the individual. An "individual" may be a type of equipment that falls within certain parameters, such as a transformer with a particular oil. The definition of "individual" may vary based on the level of granularity desired by the system 200. For example, the transformer 202 may be designated "ABC1" before an oil change and "ABC2" after an oil change, and ABC1 and ABC 2 may be treated as two separate individuals. In other embodiments, the system 200 may treat the transformer 202 as a single individual despite the oil change. As will be described later in greater detail, the maintenance restart logic evaluates current and past test results to identify and handle changes in the transformers 202 and 204 that may disrupt later analysis steps.

In step 308, the number of available test data values for the particular test being processed is determined. In the present example, the number of test values is determined to have one of three possible values: one test data value (e.g., only the received test data value), two test data values (e.g., the received test value and one stored value), or three or more test data values.

In step 310, if there are three or more test data values, parameters for the individual (e.g., the transformer 202) that was tested are determined using the received test data by calculating the first and second derivatives (e.g., velocity and acceleration). In step 312, client class parameters are determined by calculating the first and second derivatives and position for the client class. This step provides a first and second derivative and position information based on a set of the client's individuals (e.g., based on similar individuals belonging to the same client as defined in the client information 212), where the set may include the transformer 202. In step 314, control parameters are determined by calculating first and second derivatives and position for the control class. This step provides a first and second derivative and position information based on a set of control individuals (e.g., based on similar individuals belonging to the control class as defined in the control information 214), where the set may include the transformer 202.

It is understood that "similar" individuals for steps 312 and 314 may be defined in many different ways, with narrower definitions restricting the set to individuals that more closely match the individual being tested but also providing fewer data points for analysis purposes. Accordingly, the definition of "similar" may be adjusted based on the desired performance of the system 200 and the amount of data for a particular type of individual. For example, a broader definition may be used if few possible matches are present in the system, while a narrower definition may be used if the number of individuals in the system provide many possible matches. In step 316, credibility weighting is performed using the client and control class information of steps 312 and 314 to improve later statistical estimates.

In step 318, if there are only two test data values, data from the control class matching the individual is divided by first derivative into bands. In step 320, an average second derivative is calculated for each band. In step 322, the individual is assigned the average second derivative corresponding to the band into which the individual's first derivative falls. This enables an estimated second derivative to be assigned to the individual even though the individual is not associated with enough data points to enable the calculation of an actual second derivative.

In step 322, if there are two or more test data values, a prediction function is set for time t. The prediction function of step 322 is the final product of the data analysis steps and may be used to determine a final position of a given value for use in data output calculations. For example, with an input of time t, the prediction function enables a prediction for time t to be made regarding the individual corresponding to the test data (e.g., the transformer 202) and/or other individuals or sets of individuals.

In step 324, if there is only one test data value, the test data is stored in the database 210 and no other action is taken. This test data may be used when additional test data becomes available.

In steps 328, 330, and 332, various outputs may be provided to a user, including failure statistics based on actuarial life tables of electrical equipment (step 328), a comparison of predicted versus actual results (step 330), and a time to failure analysis (step 332).

Figure 4:
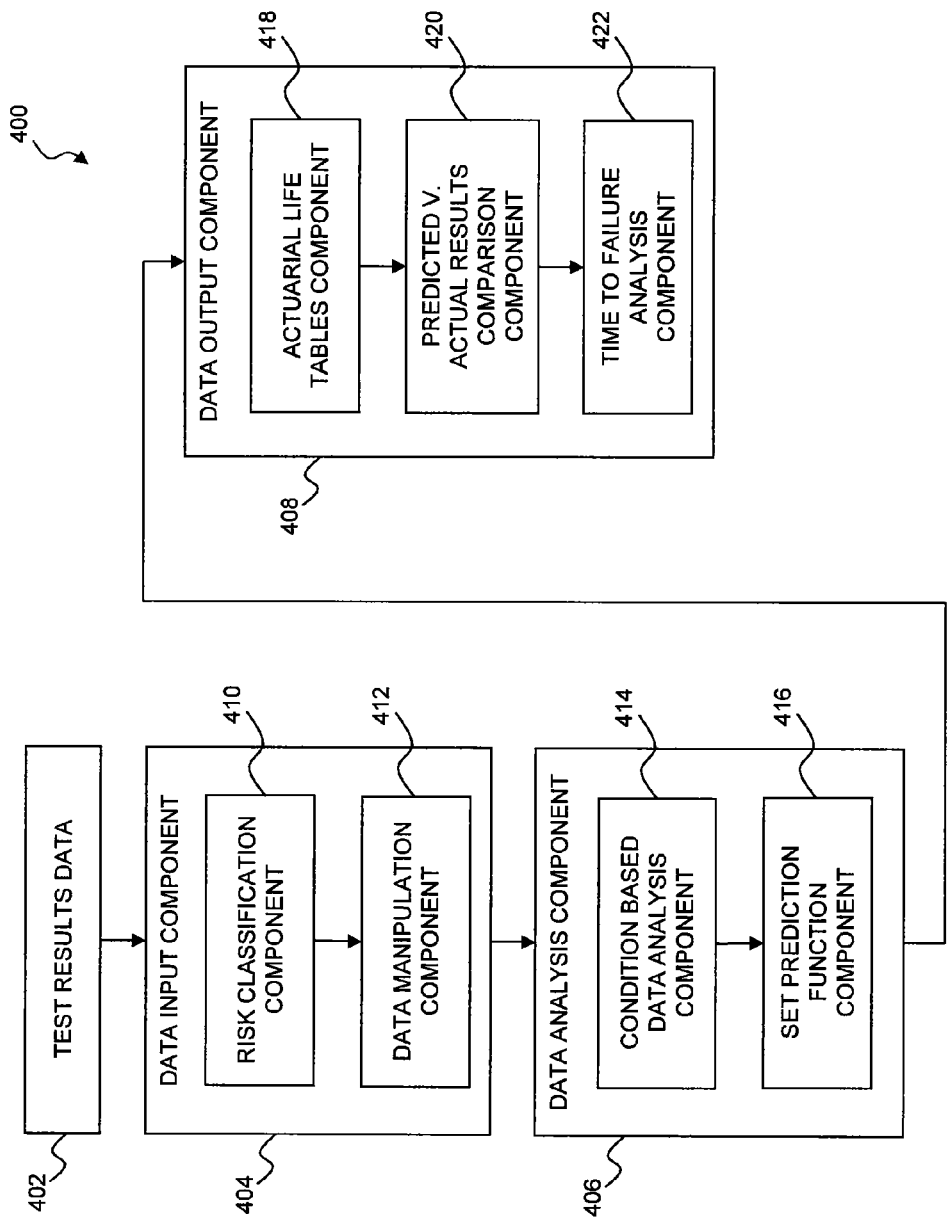
FIG. 4 is a flow chart illustrating one embodiment of an architecture that may be used to implement the method of FIG. 3 within the system of FIG. 2A.

Referring to FIG. 4, one embodiment of a software architecture 400 is illustrated. The architecture 400 provides one example of a framework within which the method 300 of FIG. 3 may be performed using a system such as the system 200 of FIG. 2A. With respect to the architecture 400, it is noted that terms such as "component," "subcomponent," and "function" are used for purposes of convenience in describing various portions of the architecture and do not denote a particular relationship or manner of operation.

The architecture 400 includes a data input component 404, a data analysis component 406, and a data output component 408. The data input component 404 receives test results data 402 and performs its functions using a risk classification component 410 and a data manipulation component 412. The data analysis component 406 receives information from the data input component 404 and performs data analysis using a condition based data analysis component 414 that produces values for use by a set prediction function component 416. The data output component 408 receives information from the data analysis component 406 and performs its functions using an actuarial life table(s) component 418, a predicted versus actual results comparison component 420, and a time to failure analysis component 422. Each of the data input component 404, data analysis component 406, and data output component 408 are discussed in greater detail below with their various subcomponents.

Figure 5:
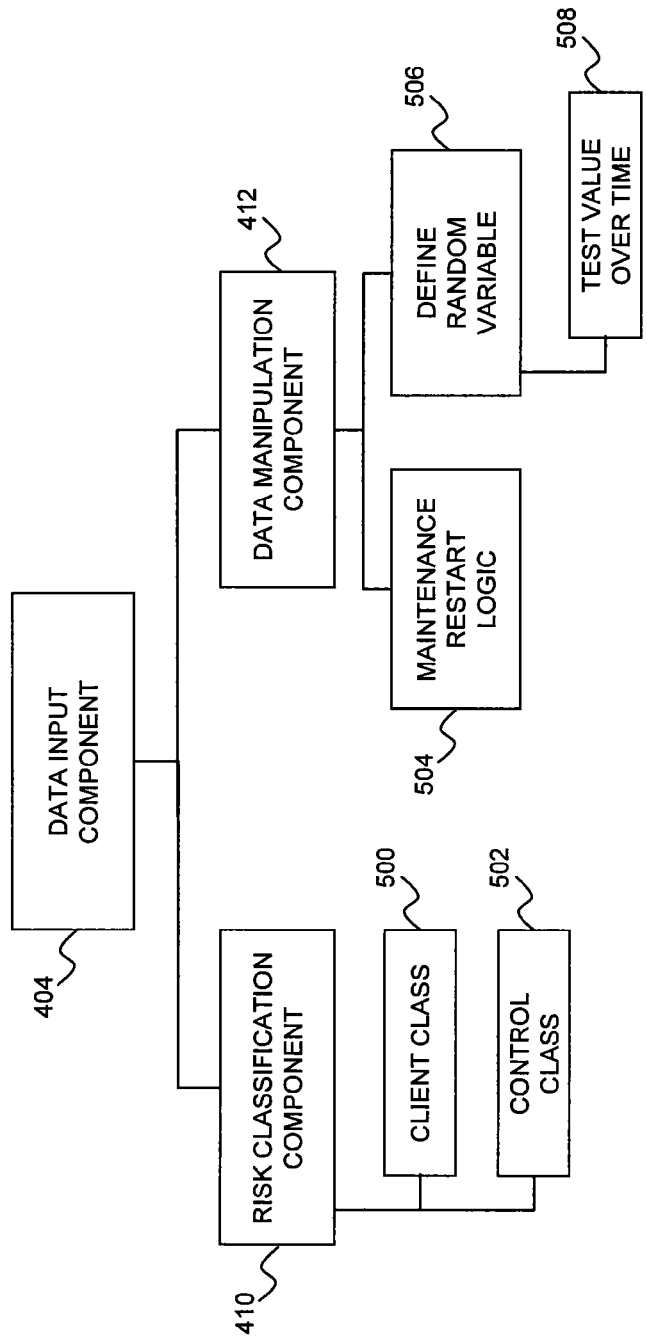
FIG. 5 is a diagram illustrating one embodiment of a data input component of the architecture of FIG. 4.

Referring to FIG. 5, one embodiment of the data input component 404 of FIG. 4 is illustrated in greater detail. The transformers 202, 204, and 206 will be used throughout the following discussion for purposes of illustration. If a single transformer is being discussed, the transformer 202 will be used. In the present example, functionality provided by the risk classification component 410 is executed before functionality provided by the data manipulation component 412.

The risk classification component 410 includes a plurality of client classes 500 (e.g., the client information 212 of FIG. 2A) and one or more control classes 502 (e.g., the control information 214 of FIG. 2A). One function of the risk classification component 410 is to enable grouping of electrical equipment and corresponding test results using various criteria. Using electrical transformers as an example, differences in location may play a role in longevity due to difference in ambient temperature and humidity. Accordingly, grouping transformers that are in the same building, city, etc., may be useful in predicting the transformers' future operational lifetimes, performance, and other parameters.

Each client class 500 is associated with a single client. A client may be defined in many different ways, including customers, locations, etc. For example, a client may be defined as a customer, so any business is a single client regardless of size. Alternatively, a client may be defined as a location, so a customer having multiple locations would be represented by a separate client class 500 for each location. A location may be of different sizes, such as a campus or office complex, a single building, or an equipment room. Accordingly, client classes 500 may be defined in a manner that best fits the information handled by the risk classification component 410 and the desired uses for that information. In the present example, a client is a location such as a campus/office complex or a single building (if the client is not large enough for multiple buildings).

The control class 502 (or classes in some embodiments) contains information from all the client classes 500. As an information aggregator, the control class 502 enables data analysis that is performed for a single client to benefit from a much wider knowledge base provided by information from all clients, although this information may not be directly accessible to the single client. The control classes 502 may be formatted to enable desired information to be identified, aggregated, and applied to a specific request.

The aggregated information may be indexed in many different ways to provide a desired level of granularity for analysis purposes. Environmental conditions, locations, general class of equipment (e.g., transformers), specific types of equipment (e.g., model of transformer), specific parameters of equipment (e.g., year transformer was placed into service or manufactured, or current lifetime of transformer), and other criteria may be used to identify relevant information in the control class for analysis purposes. Accordingly, while a single client may directly access only that client's information in the system 200 of FIG. 2A, the client may benefit from the control class in terms of the predictions made by the architecture 400. This indirect access of the control class information ensures that a much broader pool of knowledge is used for each client, and provides additional data points for analysis purposes. It is understood that, in some embodiments, a client may also run various analyses based on only the client's data.

The following table (Table 1) illustrates information that may be used with the risk classification component 410. Table 1 and other tables in the following description define information that may be associated with various columns in a spreadsheet or fields in a database. Unless otherwise noted, the first column of each table defines the column where the information is located, the second column defines the name (e.g., type) of information, and the third column describes the source of information (e.g., another location or a formula). It is understood that Table 1 and other tables are merely examples and that many different formats may be used for organizing and presenting the information.

TABLE 1

| Column(s) | Name | Formula (Description) |
|---|---|---|
| A | Client ID | from Client Table |
| B | Xfmr ID | from Name Plate Table |
| C | Test ID | Auto Number |
| D | Serial Number | from Name Plate Table |
| E | Test Date | — |
| F . . . N | Screen Test Values | — |
| O . . . W | Diagnostic Gas Analysis (DGA) Test Values | — |

As illustrated in Table 1, incoming test result information for the transformer 202 is sorted into columns A-W. Column A contains a client identifier (ID) obtained from a client table stored in the database 210 of FIG. 2A. Column B contains a transformer (Xfmr) ID for the transformer 202. The transformer ID is pulled from a name plate table stored in the database 210. Column C contains a test ID that is automatically generated by the architecture 400. Column D contains a serial number obtained from the name plate table. Column E contains a test date that represents the date on which the tests were performed. Columns F-N contain screen test values obtained from performing a screen test on the transformer identified by the transformer ID (column B) on the test date (column E). Columns O-W contain diagnostic gas analysis (DGA) test values obtained from performing a DGA test on the transformer.

If the transformer 202 has not been entered into the system 200, some information shown in Table 1 may not be available. For example, the transformer ID would not be available from the name plate table if this information has not yet been entered. Accordingly, the information is already entered into the system 200 for purposes of the examples described herein, but must be entered if it is not yet in the system. Furthermore, it is understood that the number and types of tests performed may vary from those illustrated. For example, different tests may be performed on a transformer and different types of equipment may require different tests.

The data manipulation component 412 includes maintenance restart logic 504 and a define random variable function 506 that defines a test value over time 508. The maintenance restart logic 504 may be used to handle equipment changes that would skew test results if not addressed. For example, if oil in the transformer 202 is changed or filtered, subsequent oil quality tests would likely be significantly different from oil quality tests performed prior to the oil change or filtering. Accordingly, the maintenance restart logic 504 identifies such occurrences based on current and past test values and automatically restarts the maintenance schedule for that particular transformer. This may be done by assigning the transformer 202 a new transformer ID or by otherwise differentiating the transformer tests based on whether they occurred before or after the major change. For example, the transformer 202 may initially be assigned the transformer ID of "ABC1" and may be assigned the transformer ID of "ABC2" after the change is detected. This enables the transformer 202 to be tracked using the same basic name of ABC, but also enables the architecture 400 to differentiate and track major maintenance events for the transformer.

The following table (Table 2) illustrates information that may be used with the maintenance restart logic 504.

TABLE 2

| Column | Name | Formula (Description) |
| --- | --- | --- |
| A | Client ID | from Table 1 |
| B | Xfmr ID | from Table 1 |
| C | Test ID | from Table 1 |
| D | Row Number | Auto Number |
| E | Serial Number | from Table 1 |
| F | Test Date | from Table 1 |
| G | IFT Improve | Current IFT − Previous IFT |
| H | NN Improve | Current NN − Previous NN |
| I | CN Improve | Current CN − Previous CN |
| J | Restart | If All Improve > 0 Then True, Else False |

As illustrated in Table 2, columns A-C, E, and F contain information obtained from Table 1, which is described above. Column D contains a row number that is automatically generated. Columns G-F provide the logic portion of the maintenance restart logic 504. In the present example, the logic portion uses three values to determine whether a restart is needed. Column G contains an interfacial tension (IFT) improve value, which defined as IFT Improve=Current IFT− Previous IFT. Column G contains a neutrality number (NN) improve value that is defined as NN Improve=Current NN−Previous NN. Column I contains a color number (CN) value that is defined as CN Improve=Current CN−Previous CN. To determine whether a restart should be performed, a determination is made as to whether the IFT Improve value, NN Improve value, and CN Improve value are all greater than zero. If yes, a restart is performed. If no, the restart is not performed.

Figure 6:
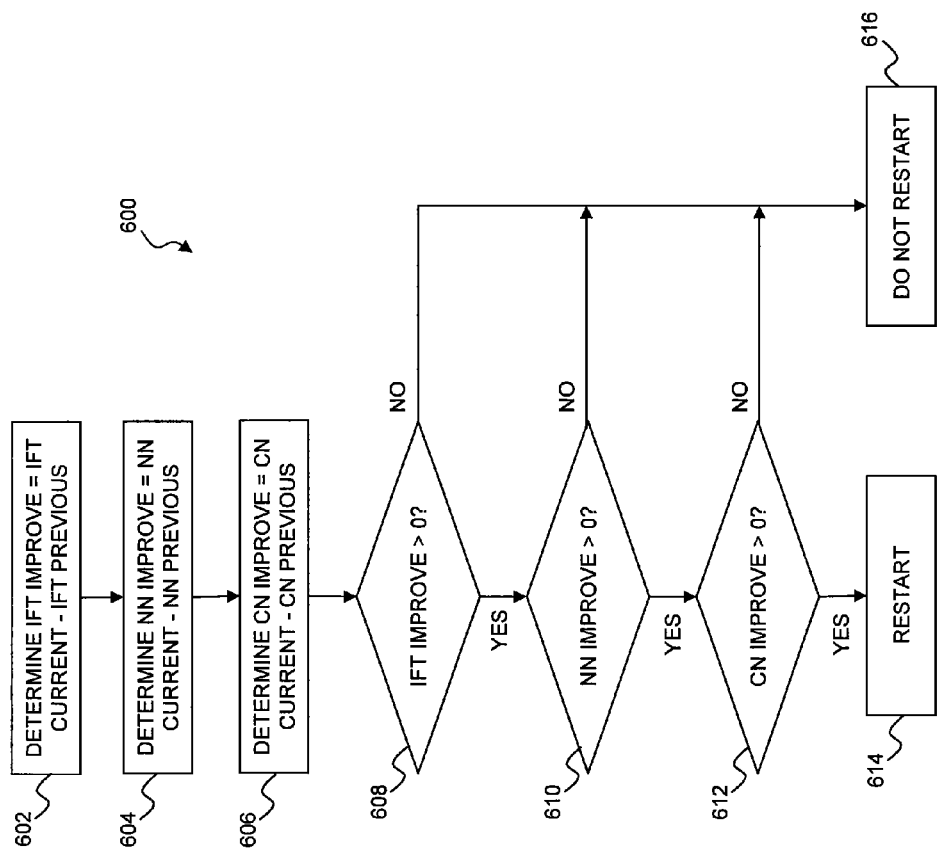
FIG. 6 is a flowchart illustrating one embodiment of a method that may be used by the data input component of FIG. 5.

With additional reference to FIG. 6, a method 600 illustrates one embodiment of the maintenance restart logic 504. In steps 602, 604, and 606, respectively, the values for IFT Improve, NN Improve, and CN Improve are determined as described above with respect to Table 2. In step 608, a determination is made as to whether the IFT Improve value is greater than zero. If the IFT Improve value is greater than zero, the method 600 continues to step 610. If the IFT Improve value is not greater than zero, the method 600 moves to step 616 and ends without initiating a restart. In step 610, a determination is made as to whether the NN Improve value is greater than zero. If the NN Improve value is greater than zero, the method 600 continues to step 612. If the NN Improve value is not greater than zero, the method 600 moves to step 616 and ends without initiating a restart. In step 612, a determination is made as to whether the CN Improve value is greater than zero. If the CN Improve value is greater than zero, the method 600 continues to step 614, where the maintenance logic for the particular component (e.g., the transformer 202) is restarted. If the CN Improve value is not greater than zero, the method 600 moves to step 616 and ends without initiating a restart.

It is understood that the steps may be in a different order than the order shown in FIG. 6. For example, the greater than zero determination for each test may occur directly after the test value is calculated. Furthermore, the tests may be performed in a different order, different tests may be used, and/or more or fewer tests may be used. Accordingly, the method 600 provides an example of the maintenance restart logic 504, but the present disclosure is not limited to the method 600. Any value or values may be used that enable the maintenance restart logic 504 to determine whether a statistically significant change has occurred to the individual whose test results have been received.

Referring again to FIG. 5, data manipulation component 412 may also include a define random variable function 506 and a test value over time function 508. This may be used to define the test value that is going to be predicted as a selected random variable (e.g., any desired variable associated with the individual). Other examples of possible test values include the change in a test value over time or the percentage change between test values. Accordingly, predictions may be made for any variable or values selected for use by the test value over time function 508.

Figure 7:
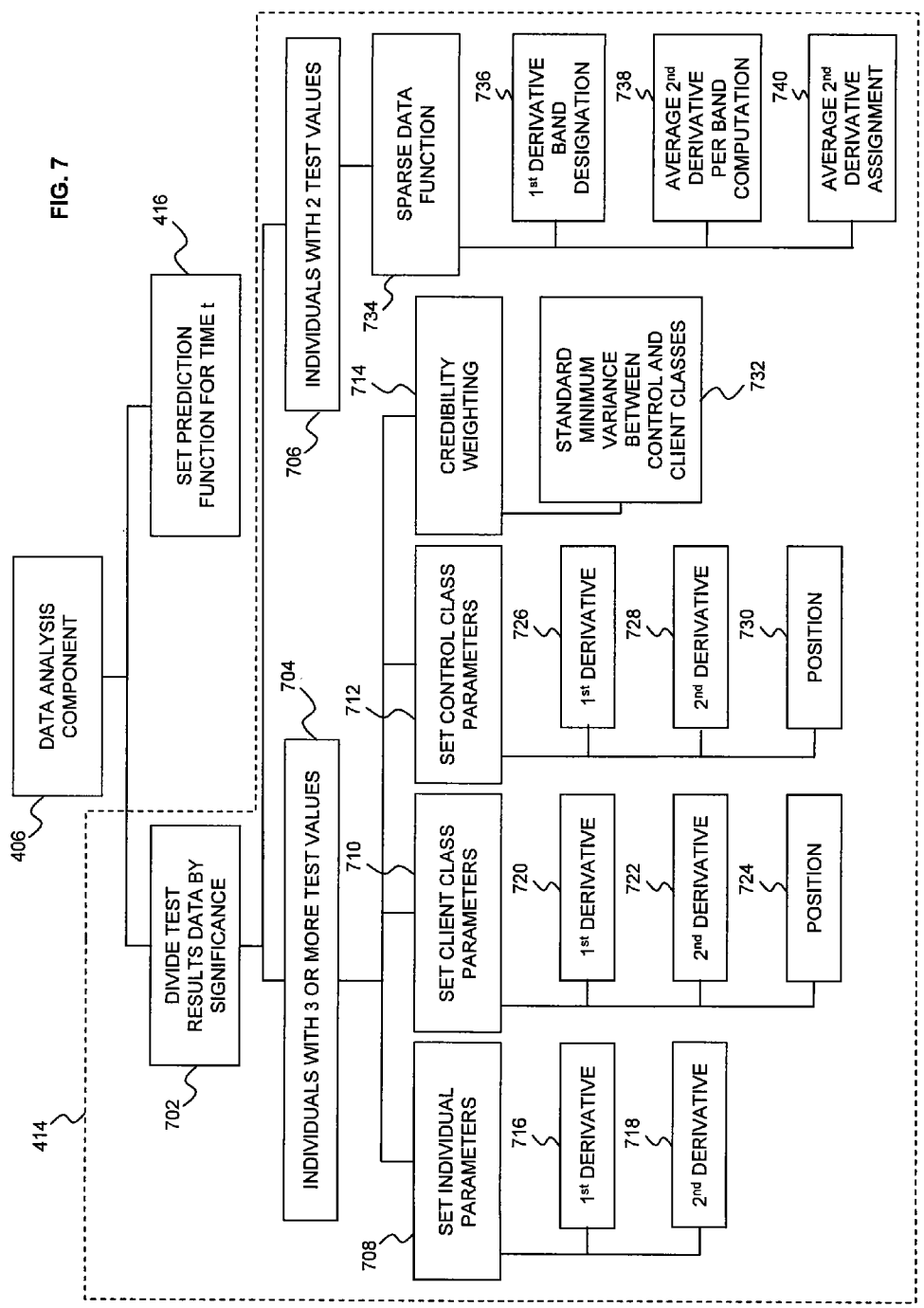
FIG. 7 is a diagram illustrating one embodiment of a data analysis component of the architecture of FIG. 4.

Referring to FIG. 7, one embodiment of the data analysis component 406 of FIG. 4 is illustrated in greater detail. The data analysis component 406 performs data analysis functions using the condition based data analysis component 414 and also includes a set prediction function component 416. In the present example, the condition based data analysis component 414 performs operations that produce results used by the set prediction function component 416

The condition based data analysis component 414 includes a function 702 for dividing the test results data by significance. This is accomplished by choosing a processing path for an individual based on the number of test values available for that individual.

In the present embodiment, individuals with three or more test values are processed by a component 704 and individuals with two test values are processed by a component 706. An individual with a single test value may be entered into the system 200 but not acted upon until further test results are obtained and the individual can be processed by one of the components 704 or 706.

The component 704 is responsible for handling individuals associated with three or more test values. This handling may include executing functions that include a set individual parameters function 708, a set client class parameters function 710, a set control class parameters function 712, and a credibility weighting function 714. For processing purposes, the individual parameters may be based only on information from the tested individual. The client class parameters may be based on information from multiple individuals that both belong to the tested individual's client and share defined characteristics (e.g., location, type) with the tested individual. The control class parameters may be based on information from multiple individuals that share defined characteristics with the tested individual, where the individuals belong to multiple clients.

The following table (Table 3) illustrates information that may be used with the component 704.

TABLE 3

| Column | Name | Formula (Description) |
|---|---|---|
| A | Client ID | from Table 1 |
| B | Xfmr ID | from Table 1 |
| C | Row Number | from Table 2 |
| D | Test Date | from Table 1 |
| E | Test Value | from Table 1 |
| F | Date 0 | First Test Date |
| G | Time (t) | Current Date − Date 0 |
| H | Delta t | Current t − Previous t |
| I | Change | Current Test Value − Previous Test Value |
| J | Change/Year | Change Annualized (Change/Delta t) |
| K | Change in Change | Current Change − Previous Change |
| L | Change in Change/Year | Change in Change Annualized (Change in Change/Delta t) |
| M | Change in Change/Year Collar | Set All Greater than 0, Equal to 0 |

As illustrated in Table 3, columns A-E contain information obtained from Tables 1 or 2, which are described above. Column F contains a Date 0 value that is equivalent to the first test date for the individual associated with Table 3 (e.g., the transformer 202 as designated ABC2). Column G contains a Time (t) value that is defined as Current Date−Date 0. Column H contains a Delta t value that is defined as Current t−Previous t. Column I contains a Change value that is defined as Current Test Value−Previous Test Value. Column J contains a Change/Year value that is defined as Change Annualized (Change/Delta t). Column K contains a Change in Change value that is defined as Current Change−Previous Change. Column L contains a Change in Change/Year value that is defined as Change in Change Annualized (Change in Change/Delta t). Column M contains a Change in Change/Year Collar, which tests for values greater than zero and sets all values greater than zero to zero. It is understood that references to a "Previous" value, such as Previous t, may refer to a previous Table 3 for this individual from a timeline perspective. The values determined according to Table 3 are used in other calculations of the component 704.

Figure 8:
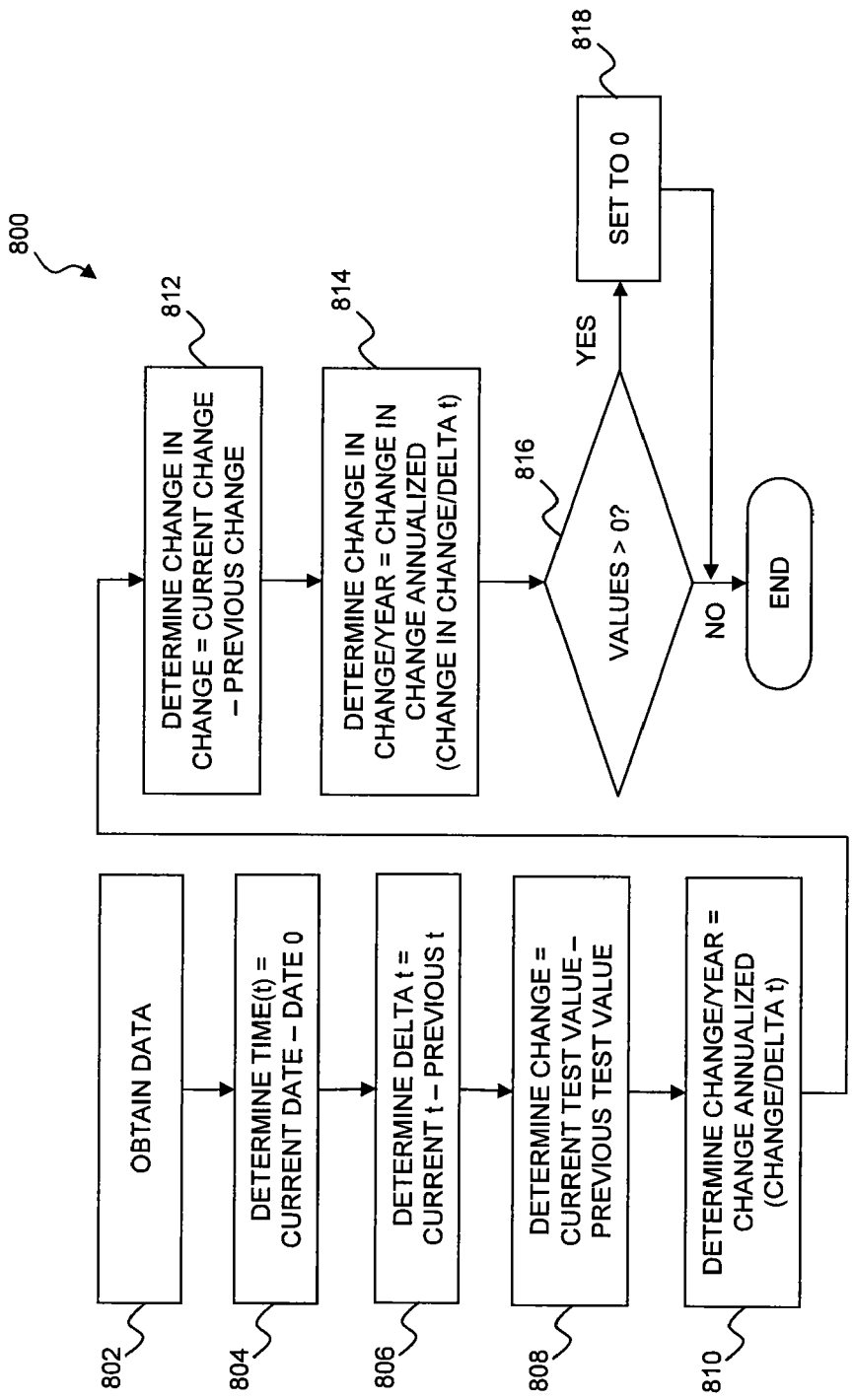

With additional reference to FIG. 8, a method 800 illustrates one embodiment of the process illustrated by Table 3. In step 802, the method 800 obtains data needed for the various calculations from, for example, Tables 1, Table 2, and the previous Table 3. It is understood that this data may be obtained immediately prior to or during the step in which the data is needed, rather than at the beginning as shown. In steps 804, 806, and 808, respectively, values for Time (t), Delta t, and Change are determined as described above with respect to Table 3. In steps 810, 812, and 814, values for Change/Year, Change in Change, and Change in Change/Year are determined as described above with respect to Table 3. In step 816, a determination is made as to whether values calculated in steps 804-814 are greater than zero. Any values greater than zero are set to zero in step 818 before the method 800 ends. If no values are greater than zero, the method 800 ends.

Referring again to FIG. 7, the set individual parameters function 708 includes calculating a first derivative 716 and a second derivative 718. This is described in greater detail below with respect to Table 4. It is noted that each individual (e.g., the transformer 202 designated as ABC2) is associated with its own deviation, velocity (i.e., first derivative), and acceleration (e.g., second derivative), and values for each test may be calculated for each individual and test date.

The following table (Table 4) illustrates information that may be used with the set individual parameters function 708.

TABLE 4

| Column | Name | Formula (Description) |
|---|---|---|
| A | Client ID | from Table 1 |
| B | Xfmr ID | from Table 1 |
| C | Delta t | from Table 3 |
| D | Change | from Table 3 |
| E | Change in Change/Year | from Table 3 |
| F | Collar | from Table 3 |
| G | Xfmr Velocity | Average Velocity (Sum Change/Sum Delta t) |
| H | Xfmr Acceleration | Average Acceleration (Average Change in Change/Year) |
| I | Xfmr Standard Deviation | Standard Deviation of Each Xfmr Collar |
| J | Average Xfmr Acceleration | Collar for Xfmr Acceleration (i.e., Min (0, Xfmr Acceleration)) |

As illustrated in Table 4, columns A-F contain information obtained from Tables 1 or 3, which are described above. Column G contains a Transformer Velocity value (i.e., first derivative 716) that is defined as Average Velocity (Sum Change/Sum Delta t). Column H contains a Transformer Acceleration value (e.g., second derivative 718) that is defined as Average Acceleration (Average Change in Change/Year). Column H contains a Transformer Standard Deviation value that is defined as a Standard Deviation of each Xfmr Collar. Column J contains an Average Transformer Acceleration value that is defined as a Collar for Xfmr Acceleration (i.e., Min (0, Xfmr Acceleration)). It is noted that Table 4 may be test specific, so a single individual may be associated with multiple versions of Table 4 distinguished by the type of test.

Figure 9:
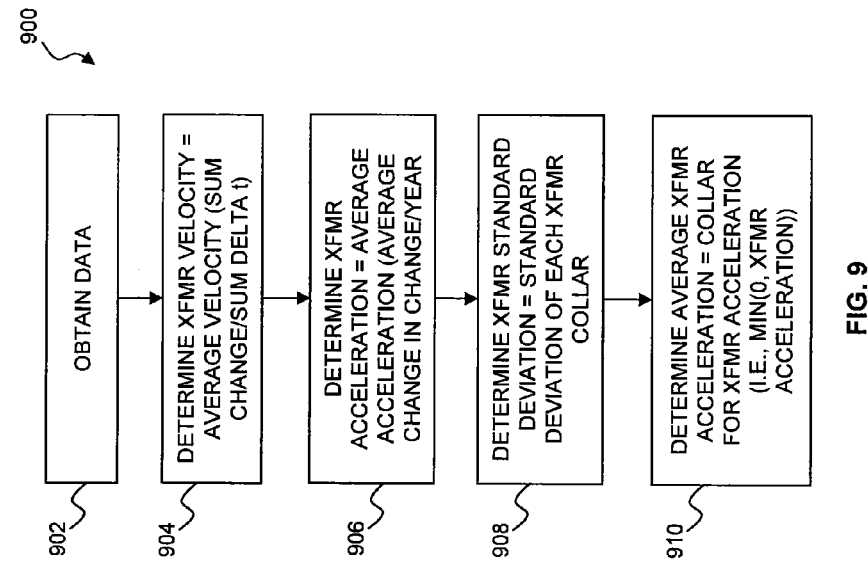

With additional reference to FIG. 9, a method 900 illustrates one embodiment of the process illustrated by Table 4. In step 902, the method 900 obtains data needed for the various calculations from, for example, Tables 1 and 3. It is understood that this data may be obtained immediately prior to or during the step in which the data is needed, rather than at the beginning as shown. In steps 904, 906, 908, and 910, respectively, values for Transformer Velocity, Transformer Acceleration, Transformer Standard Deviation, and Average Transformer Acceleration are determined as described above with respect to Table 3. Method 900 may be repeated for each test performed for the current individual.

Referring again to FIG. 7, the set client class parameters function 710 includes calculating a first derivative 720, a second derivative 722, and a position 724. This is described in greater detail below with respect to Tables 5 and 6.

The following tables (Tables 5 and 6) illustrate information that may be used with the set control class parameters function 710. More specifically, Table 5 relates to the first derivative 720 and second derivative 722, and Table 6 relates to the position 724.

TABLE 5

| Column | Name | Formula (Description) |
|---|---|---|
| A | Client ID | from Table 1 |
| B | Collar | from Table 3 |
| C | Average Xfmr Acceleration | from Table 4 |
| D | Client Xfmr Standard Deviation | Standard Deviation of Collar by Client |
| E | Client Xfmr Acceleration | Average Average Xfmr Acceleration by Client |
| F | Control Xfmr Standard Deviation | Standard Deviation of Collar for Control |
| G | Control Xfmr Acceleration | Average Client Xfmr Acceleration |

Table 5 includes information for both the set client class parameters function 710 and set control class parameters function 712. More specifically, columns D and E relate to the set client class parameters function 710, and columns F and G relate to the set control class parameters function 712. As the present discussion is directed to the set client class parameters function 710, columns F and G will not be discussed until later.

As illustrated in Table 5, columns A-C contain information obtained from Tables 1, 3, and 4, respectively, which are described above. Column D contains a Client Xfmr Standard Deviation value that is defined as a Standard Deviation of Collar by Client. Column E contains a Client Xfmr Acceleration value that is defined as an Average Average Xfmr Acceleration by Client. These calculations may be repeated for each client.

Figure 10:
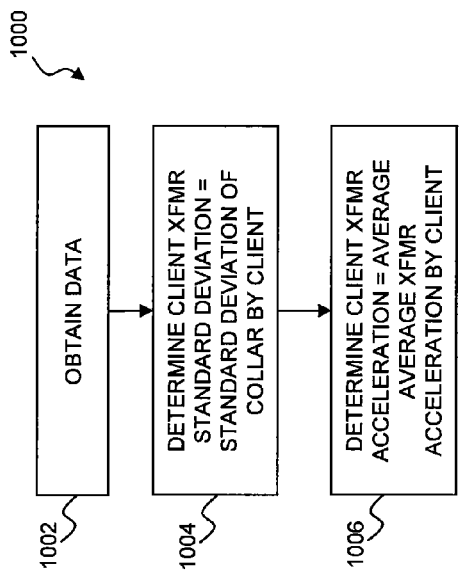

With additional reference to FIG. 10, a method 1000 illustrates one embodiment of the process illustrated by Table 5. In step 1002, the method 1000 obtains data needed for the various calculations from, for example, Tables 1, 3, and 4. It is understood that this data may be obtained immediately prior to or during the step in which the data is needed, rather than at the beginning as shown. In steps 1004 and 1006, respectively, values for Client Transformer Standard Deviation and Client Transformer Acceleration are determined as described above with respect to columns D and E of Table 5.

Referring again to FIG. 7, Table 6 (below) provides information regarding the position 724.

TABLE 6

| Column | Name | Formula (Description) |
|---|---|---|
| A | Client ID | from Table 1 |
| B | Xfmr ID | from Table 1 |
| C | Last Value (Position 0) | from Table 3 |
| D | Xfmr Velocity (Velocity 0) | from Table 4 |
| E | Client Xfmr Acceleration | from Table 5 |
| F | Predict Time (p) | Integer Year Out into the Future |
| G | Client Predict Velocity | Velocity0 + Client Xfmr Acceleration * p |
| H | Client Predict Position | Position0 + Velocity0 * p + Client Acceleration * (p^2/2) |

As illustrated in Table 6, columns A-E contain information obtained from Tables 1 and 3-5, which are described above. Column F contains a Predict Time (p) value that is defined as an integer year out into the future. This is the future time in years for which the prediction is to made. Column G contains a Client Predict Velocity value that is defined as Velocity0+ Client Xfmr Acceleration*p. Column H includes a Client Predict Position value that is defined as Position0+ Velocity0*p+Client Acceleration*(p^2/2).

With additional reference to FIG. 11, a method 1100 illustrates one embodiment of the process illustrated by Table 6. In step 1102, the method 1100 obtains data needed for the various calculations from, for example, Tables 1 and 3-5. It is understood that this data may be obtained immediately prior to or during the step in which the data is needed, rather than at the beginning as shown. In step 1104, a value "p" may be obtained for a Predict Time (p) function. In steps 1106 and 1108, respectively, values for Client Predict Velocity and Client Predict Position are determined as described above in columns D and E of Table 5. Method 1100 may be repeated for each test performed for the current individual.

Referring again to FIG. 7, the set control class parameters function 712 includes calculating a first derivative 726, a second derivative 728, and a position 730. This is described in greater detail with respect to Table 5 (above) and Table 7 (below). More specifically, Table 5 relates to the first derivative 726 and second derivative 728, and Table 7 relates to the position 730.

As discussed previously, Table 5 includes information for both the set client class parameters function 710 and set control class parameters function 712. As the present discussion is directed to the set control class parameters function 712, columns F and G will now be described. As illustrated in Table 5, columns A-C contain information obtained from Tables 1, 3, and 4, respectively, which are described above. Column F contains a Control Xfmr Standard Deviation value that is defined as a Standard Deviation of Collar for Control, where the control set may include individuals that correspond to the tested individual from all clients. Column G contains a Control Xfmr Acceleration value that is defined as an Average Client Xfmr Acceleration.

Figure 12:
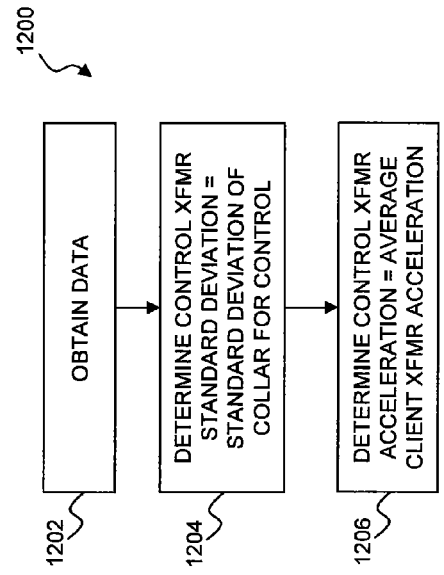

With additional reference to FIG. 12, a method 1200 illustrates one embodiment of the process illustrated by Table 5. In step 1202, the method 1200 obtains data needed for the various calculations from, for example, Tables 1, 3, and 4. It is understood that this data may be obtained immediately prior to or during the step in which the data is needed, rather than at the beginning as shown. In steps 1204 and 1206, respectively, values for Control Transformer Standard Deviation and Control Transformer Acceleration are determined as described above with respect to columns F and G of Table 5.

Referring again to FIG. 7, the following table (Table 7) illustrates information that may be used with the control class parameters function 710. More specifically, Table 7 relates to information used for the position 730.

TABLE 7

| Column | Name | Formula (Description) |
|---|---|---|
| A | Xfmr ID | from Table 1 |
| B | Last Value (Position 0) | from Table 3 |
| C | Xfmr Velocity (Velocity 0) | from Table 4 |
| D | Control Xfmr Acceleration | from Table 5 |
| E | Predict Time (p) | Integer Year Out into the Future |
| F | Control Predict Velocity | Velocity 0 + Control Xfmr Acceleration * p |
| G | Control Predict Position | Position0 + Velocity0 * p + Control Acceleration * (p^2/2) |

As illustrated in Table 7, columns A-D contain information obtained from Tables 1 and 3-5, which are described above.

Column E contains a Predict Time (p) value that is defined as an integer year out into the future. Column F contains a Control Predict Velocity value that is defined as Velocity0+Control Xfmr Acceleration*p, where the control set may include individuals that correspond to the tested individual from all clients. Column H includes a Control Predict Position value that is defined as Position0+Velocity0*p+Control Acceleration*(p^2/2).

With additional reference to FIG. 13, a method 1300 illustrates one embodiment of the process illustrated by Table 7. In step 1302, the method 1300 obtains data needed for the various calculations from, for example, Tables 1 and 3-5. It is understood that this data may be obtained immediately prior to or during the step in which the data is needed, rather than at the beginning as shown. In step 1304, a value "p" may be obtained for a Predict Time (p) function. In steps 1306 and 1308, respectively, values for Control Predict Velocity and Control Predict Position are determined as described above with respect to columns F and G of Table 7.

Referring again to FIG. 7, the credibility weighting function 714 includes a function 732 for calculating a standard minimum variance between the control classes 502 and client classes 500 of FIG. 5 using the client class parameters 710 and control class parameters 712. This process is described in greater detail below with respect to Table 8.

The following table (Table 8) illustrates information that may be used with the credibility weighting function 714.

TABLE 8

| Column | Name | Formula (Description) |
|---|---|---|
| A | Client ID | from Table 1 |
| B | Xfmr ID | from Table 1 |
| C | Client Xfmr Standard Deviation | from Table 5 |
| D | Control Xfmr Standard Deviation | from Table 5 |
| E | Client Variance-1 | 1/Client Standard Deviation^2 |
| F | Control Variance-1 | 1/Control Standard Deviation^2 |
| G | Client Weight | Client Variance-1/(Client Variance-1 + Control Variance-1) |
| H | Control Weight | 1-Client Weight |

As illustrated in Table 8, columns A-D contain information obtained from Tables 1 and 5, which are described above. Column E contains a Client Variance-1 value that is defined as 1/Client Standard Deviation^2. Column F contains a Control Variance-1 value that is defined as 1/Control Standard Deviation^2. Column G contains a Client Weight value that is defined as Client Variance-1/Client Variance-1+Control Variance-1). Column H contains a Control Weight value that is defined as 1-Client Weight.

With additional reference to FIG. 14, a method 1400 illustrates one embodiment of the process illustrated by Table 8. In step 1402, the method 1400 obtains data needed for the various calculations from, for example, Tables 1 and 5. It is understood that this data may be obtained immediately prior to or during the step in which the data is needed, rather than at the beginning as shown. In steps 1404, 1406, 1408, and 1410, respectively, values for Client Variance-1, Control Variance-1, Client Weight, and Control Weight may be determined as described above with respect to Table 8.

Referring again to FIG. 7, the component 706 handles individuals associated with only two test values. This handling may include the execution of a sparse data function 734, which uses a banding process to estimate and assign a second derivative to an individual. The sparse data function 734 may accomplish this through various functions, including a function 736 for designating multiple first derivative bands in control class data, a function 738 for calculating an average second derivative for each of the bands, and a function 740 for assigning the calculated average second derivative to an individual. Accordingly, the sparse data function 734 enables the component 706 to provide an estimated value for a second derivative for individuals that lack enough data points to enable a second derivative to be directly calculated.

With additional reference to FIG. 15, a method 1500 illustrates one embodiment of the sparse data function 734. In step 1502, the method 1500 obtains data needed for the various calculations from, for example, the client control classes 502 of FIG. 5. It is understood that this data may be obtained immediately prior to or during the step in which the data is needed, rather than at the beginning as shown. This data may include a first derivative calculated from test data that is associated with the individual, as well as first derivatives from control data corresponding to the tested individual. For example, the data may be from control data for transformers corresponding to the transformer 202.

In step 1504, the sparse data function 734, which may be based on a bell curve or other probability density graph, divides the first derivatives from the control data corresponding to the individual into a number of bands (e.g., ten). In step 1506, an average second derivative is calculated for each band. It is understood that the bands and/or average second derivatives may be pre-calculated and steps 1502, 1504, and 1506 may be partially or completely omitted. For example, the first derivative of the tested individual may be calculated and placed into a preexisting (relative to the calculated first derivative of the tested individual) band for which an average second derivative has been calculated. If the bands and/or average second derivatives are preexisting, the data obtained in step 1502 would be different from data obtained if the bands and average second derivatives were dynamically calculated, as is the case in the present example.

In step 1508, a second derivative is assigned to the tested individual based on the band that matches the individual's first derivative. For example, if the individual's first derivative falls into the fourth band, the average second derivative corresponding to the fourth band would be assigned to the individual as the individual's second derivative. In step 1510, the first and second derivatives are plugged into the set position function component 416, described below, to obtain a prediction for time t. For example, as the banding method used by the sparse data function 734 does not use credibility weighting, the position function (i.e., prediction) uses the newly assigned second derivative (i.e., acceleration). Accordingly, this step resembles step 1108 of FIG. 11 except that, instead of client acceleration, the current step uses the average acceleration for the band into which the tested transformer's first derivative falls.

Referring again to FIG. 7, the set prediction function component 416 enables a prediction to be calculated for an individual for a given time t. The prediction may be directed to future service dates, performance, chance of failure, etc. Accordingly, the set prediction function component 416 uses the components and functions of the data analysis component 406 to provide predictions for the data output component 408. The set prediction function component 416 may use information such as client class and control class positions, credibility weighting, sparse data function results, etc. This process is described in greater detail below with respect to Table 9.

The following table (Table 9) illustrates information that may be used with the set prediction function component 416.

More specifically, Table 9 relates to information based on the standard minimum variance between client and control classes function 732.

TABLE 9

| Column | Name | Formula (Description) |
|---|---|---|
| A | Xfmr ID | from Table 1 |
| B | Client Predict Position | from Table 6 |
| C | Control Predict Position | from Table 7 |
| D | Client Weight | from Table 8 |
| E | Control Weight | from Table 8 |
| F | Final Position | Client Position * Client Weight + Control Position * Control Weight |

As illustrated in Table 9, columns A-E contain information obtained from Tables 1 and 6-8, which are described above. Column F contains a Final Position value that is defined as Client Position*Client Weight+Control Position*Control Weight.

With additional reference to FIG. 16, a method 1600 illustrates one embodiment of the process illustrated by Table 9. In step 1602, the method 1600 obtains data needed for the various calculations from, for example, Tables 1 and 6-8. It is understood that this data may be obtained immediately prior to or during the step in which the data is needed, rather than at the beginning as shown. In step 1604, a value for a Final Position is determined as described above with respect to column F of Table 9.

Figure 17:
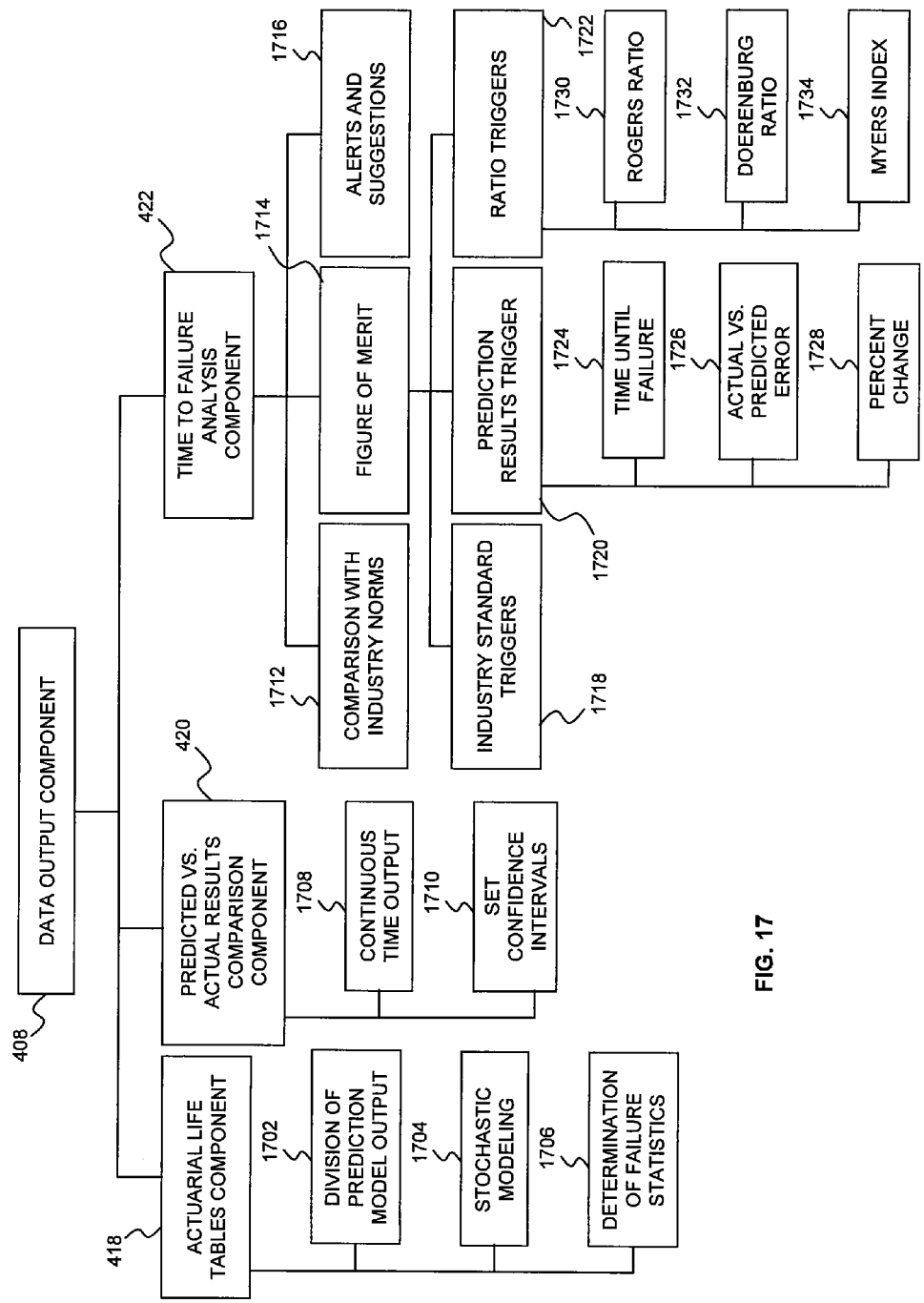
FIG. 17 is a diagram illustrating one embodiment of a data output component of the architecture of FIG. 4.

Referring to FIG. 17, one embodiment of the data output component 408 of FIG. 4 is illustrated in greater detail. The data output component 408 receives information from the data analysis component 406 and performs functions using the actuarial life table(s) component 418, the predicted versus actual results comparison component 420, and the time to failure analysis component 422. The data output component 408 provides information to users of the system 200 of FIG. 2A. Various types of output information may include projected lifespan, failure rate probability over periods of time or for selected times, recommended maintenance schedules, and similar information. The data output component 408 may also provide alerts based on values crossing a defined threshold or other triggers.

The actuarial life tables component 418 includes life tables for types of individuals and may be formed using information from, for example, the client classes 500 and control classes 502 of FIG. 5. The life tables may be based on various characteristics of a particular type of individual and on data analysis performed by data analysis component 406. For example, the life tables for electrical transformers may include failure probabilities based on a dielectric strength test. Using the set prediction function component 416 and the actuarial life tables component 418, the system 200 may determine that a transformer (e.g., the transformer 202) having a certain tested dielectric strength may have an eighty percent chance of failure within five years and a one hundred percent chance of failure within ten years.

The life tables may be dynamically created when needed or may be created and then updated. For example, the life tables may be created and then updated based on a defined update schedule or whenever additional relevant information is added to the system. In the present example, the life tables may be created and/or manipulated by the actuarial life tables component 418 using a division of prediction model output function 1702, a stochastic modeling function 1704, and a determination of failure statistics function 1706.

The division of output modeling function 1702 may be used to provide different levels of life tables. For example, predictions may be divided by individual (e.g., transformer) and then by test, with each of these new cross sections of data having its own life table.

The stochastic modeling function 1704 may be used to model multiple future possibilities. As is known, a stochastic process deals with systems in which there is some indeterminacy with respect to probability distributions. This means that there may be multiple paths, although some paths may be more probable than others. The stochastic modeling function 1704 enables the actuarial life tables component 418 to provide probabilities regarding possible outcomes (e.g., failure in a certain number of years).

The determination of failure statistics function 1706 may be used to calculate failure rates and to provide other failure-based information. Such information may include time to probable failure, probability of failure at a selected time, etc. For example, the determination of failure statistics function 1706 may be used to model a set of failure probabilities for the transformer 202 for one, five, and ten years.

The predicted versus actual results comparison component 420 includes a continuous time output function 1708 and a set confidence intervals function 1710. The predicted versus actual results comparison component 420 enables a user of the system 200 to obtain a comparison of previously predicted values versus actual values. For example, if the system 200 predicted a test result (e.g., transformer dielectric strength) for a particular individual at a given date or predicted that the test result would fall within a certain range, this may be compared against the actual test value after that date has passed and the actual test results obtained. The use of the continuous time output function 1708 enables such comparisons to be performed for any selected time. The set confidence intervals function 1710 enables confidence intervals to be set for such comparisons. For example, the confidence interval for statistics relating to transformer 202 may be the standard deviation for transformers of the same client class and/or control class. As confidence intervals are well known, they are not discussed in detail herein.

The time to failure analysis component 422 may include a comparison with industry norms function 1712, a figure of merit function 1714, and an alerts and suggestions function 1716. The time to failure analysis component 422 may use information from the data analysis component 406, from the actuarial life tables component 418, and/or from other components and functions.

The comparison with industry norms function 1712 may provide a comparison between the client's data and industry data. The industry data may be obtained as least partially from the control classes 502 of FIG. 5. For example, the transformer 202 may have a dielectric strength of twenty and the industry norm for similar transformers may be eighteen. This provides the client with information regarding their equipment as compared to others in the same industry.

The figure of merit function 1714 may provide an indication of an individual's status. For example, the figure of merit function 1714 may provide a green (normal), yellow (caution), or red (warning) status indicator to visually indicate the status of an individual, such as the transformer 202. The figure of merit function 1714 may use industry standard triggers 1718, a prediction results trigger 1720, and one or more ratio triggers 1722 to determine the status and severity (green, yellow, red) of the status indicators.

The industry standard triggers 1718 may provide triggers in the event an individual fails to meet industry standards. For example, if the dielectric strength of the transformer 202 has dropped below the industry standard, an event may be triggered and reflected in the figure of merit 1714.

The prediction results trigger 1720 may provide triggers based on one or more predictions that fall outside of defined parameters. For example, the prediction results trigger 1720 may provide triggers based on a time until failure 1724, an actual versus predicted error 1726, and a percent change 1728. The time until failure 1724 may cause a trigger event if the time to failure is within a certain threshold period (e.g., less than the next maintenance time or is relatively short and needs immediate attention). The actual versus predicted error 1726 may cause a trigger event if the error exceeds a permissible threshold. The percent change 1728 may cause a trigger event if the change percentage exceeds a certain threshold. For example, if a two percent change was expected and a ten percent change occurred, an event may be triggered to flag the unexpected change.

The ratio triggers 1722 may provide triggers based on certain ratios, such as a Rogers Ratio 1730, a Doerenburg Ratio 1732, and a Myers Index 1734. As is known to those of skill in the art, the Rogers Ratio 1730, Doerenburg Ratio 1732, and Myers Index 1734 are ratios that may be applied to test values dealing with transformers and oil condition. Such ratios may be applied using known standards indicating that when a ratio is above or below a certain number, there is potentially a problem with the tested transformer. It is understood that these are examples only and other ratios may be applied to transformers and other types of electrical equipment.

The alerts and suggestions function 1716 may provide aid to clients in the form of proactive and reactive information. For example, alerts may be triggered based on the probable near-term failure of an individual, a missed maintenance period, an excessively high failure rate, etc. Suggestions may be triggered based on equipment condition as determined from test results, etc. Suggestions may include shortening or lengthening times between maintenance for an individual or a location.

It will be appreciated by those skilled in the art having the benefit of this disclosure that alterations may be made to the systems and methods disclosed herein. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method comprising:
   receiving, by a system, test data representing an attribute of a tested electrical device, wherein the received test data is associated with a test date on which the test data was obtained from the tested electrical device;
   classifying the received test data as belonging to a first client of a plurality of clients and adding the received test data to a control set representing an aggregate of information of the plurality of clients;
   determining whether the attribute of the tested electrical device is represented in the system by only the received test data, by only two sets of test data that include the received test data and stored test data corresponding to the attribute from at least one previous test performed on the tested electrical device, or by three or more sets of test data that include the received test data and stored test data corresponding to the attribute from at least two previous tests performed on the tested electrical device;
   storing the received test data if the attribute is represented in the system by only the received test data, wherein the received test data is not processed;
   processing the received test data using a sparse data process if the attribute is represented in the system by two sets of test data;
   processing the received test data using an autoregressive process if the attribute is represented in the system by three or more sets of test data;
   predicting a future value of the attribute based on the processing by one of the sparse data process and the autoregressive process; and
   outputting at least a representation of the future value.

2. The method of claim 1 wherein processing the received test data using the sparse data process comprises:
   calculating a first derivative for the received test data;
   placing the calculated first derivative into one of a plurality of bands, wherein the bands represent non-overlapping ranges of first derivative values from the control set, and wherein each band is associated with an average second derivative; and
   assigning the average second derivative of the band into which the calculated first derivative was placed to the received test data, where the future value of the attribute is based on the calculated first derivative and the assigned average second derivative.

3. The method of claim 2 further comprising:
   dividing the control set into the plurality of bands; and
   calculating the average second derivative for each of the bands.

4. The method of claim 1 wherein processing the received test data using the autoregressive process comprises:
   determining a set of individual parameters for the tested electrical device based on the received test data, wherein the individual parameters are based only on individual information corresponding to the tested electrical device;
   determining a set of client class parameters based on the received test data, wherein the client class parameters are based on client information corresponding to all electrical devices of the first client that correspond to defined parameters of the tested electrical device;
   determining a set of control class parameters based on the received test data, wherein the control class parameters are based on control information from the control set corresponding to all electrical devices of the plurality of clients that correspond to defined parameters of the tested electrical device; and
   performing a credibility weighting to determine a standard minimum variance between the client class parameters and the control class parameters.

5. The method of claim 4 wherein:
   determining the set of individual parameters includes calculating an individual first derivative and an individual second derivative based on the individual information;
   determining the set of client class parameters includes calculating a client class first derivative, a client class second derivative, and a client class position based on the client information; and determining the set of control class parameters includes calculating a control class first derivative, a control class second derivative, and a control class position based on the control information.

6. The method of claim 5 wherein predicting the future value of the attribute includes predicting a position of the future value.

7. The method of claim 6 wherein predicting the position of the future value includes calculating the position of the future value based on the client class position, the control class position, a client class weight, and a control class weight.

8. The method of claim 1 wherein outputting at least the representation of the future value includes:
identifying a probability of failure at a defined time for the tested electrical device based on an actuarial life table of a plurality of electrical devices corresponding to defined parameters of the tested electrical device; and
outputting the probability of failure.

9. The method of claim 8 further comprising calculating the actuarial life table using a set of control class parameters, wherein the control class parameters are based on information corresponding to all electrical devices of the plurality of clients that correspond to defined parameters of the tested electrical device.

10. The method of claim 1 further comprising:
calculating a figure of merit representing a current status of the tested electrical device; and
outputting the figure of merit.

11. The method of claim 10 wherein calculating the figure of merit includes comparing the received test data to at least one corresponding industry norm.

12. The method of claim 10 wherein calculating the figure of merit includes:
calculating a ratio based on the received test data;
comparing the ratio to a known standard; and
determining the current status based on the comparison.

13. The method of claim 1 wherein the representation of the future value includes a maintenance schedule for the tested electrical device.

14. The method of claim 1 further comprising:
determining a difference between the received test data and stored test data corresponding to the attribute from at least one previous test performed on a previous test date;
determining whether the difference exceeds a defined threshold; and
assigning a new designation within the system to the tested electrical device if the difference exceeds the defined threshold, wherein the new designation is used by the system to differentiate between a first state of the tested electrical device before obtaining the received test data and a second state of the tested electrical device after obtaining the received test data.

15. The method of claim 14 wherein differences for a plurality of test values from the received test data are used to determine whether to assign the new designation.

16. A method comprising:
receiving, by a system, test data representing an attribute of a tested electrical device, wherein the received test data is associated with a test date on which the test data was obtained from the tested electrical device;
determining a difference between the received test data and stored test data corresponding to the attribute from at least one previous test conducted on a preceding test date;
determining whether the difference exceeds a defined threshold; and
assigning a new designation within the system to the tested electrical device if the difference exceeds the defined threshold, wherein the new designation is used by the system to differentiate between a first state of the tested electrical device before obtaining the received test data and a second state of the tested electrical device after obtaining the received test data;
processing the received test data using one of a sparse data process and an autoregressive process to obtain a first derivative and a second derivative representing the received test data;
determining a probable future position of the attribute relative to control information representing information corresponding to the attribute for a plurality of electrical devices, wherein the determining is based on the first derivative and the second derivative; and
outputting at least a representation of the probable future position.

17. The method of claim 16 further comprising classifying the received test data as belonging to a first client of a plurality of clients and adding the received test data to a control set representing an aggregate of information of the plurality of clients.

18. The method of claim 17 further comprising:
determining whether the attribute of the tested electrical device is represented in the system by only the received test data, by only two sets of test data that include the received test data and stored test data corresponding to the attribute from at least one previous test, or by three or more sets of test data that include the received test data and stored test data corresponding to the attribute from at least two previous tests;
storing the received test data if the attribute is represented in the system by only the received test data, wherein the received test data is not analyzed;
processing the received test data using the sparse data process if the attribute is represented in the system by two sets of test data; and
processing the received test data using the autoregressive process if the attribute is represented in the system by three or more sets of test data.

19. The method of claim 18 wherein processing the received test data using the sparse data process comprises:
calculating a velocity for the received test data;
placing the calculated velocity into one of a plurality of bands, wherein the bands represent non-overlapping ranges of velocity values from the control set, and wherein each band is associated with an average acceleration; and
assigning the average acceleration of the band into which the calculated velocity was placed to the received test data, where the probable future value of the attribute is based on the calculated velocity and the assigned average acceleration.

20. The method of claim 18 wherein processing the received test data using the autoregressive process comprises:
determining an individual velocity and an individual acceleration for the tested electrical device based on the received test data, wherein the individual velocity and the individual acceleration are based only on information corresponding to the tested electrical device;
determining a client class velocity, a client class acceleration, and a client class position based on the received test data, wherein the client class velocity, the client class acceleration, and the client class position are based on information corresponding to all electrical devices of the first client that correspond to defined parameters of the tested electrical device; and determining a control class velocity, a control class acceleration, and a control class position based on the received test data, wherein the control class velocity, the control class acceleration, and the control class position are based on information corresponding to all electrical devices of the plurality of clients that correspond to defined parameters of the tested electrical device.

21. The method of claim 20 further comprising performing a credibility weighting to determine a standard minimum variance between the client class position and the control class position.

22. The method of claim 16 wherein outputting at least the representation of the probable future position includes:
identifying a probability of failure at a defined time for the tested electrical device based on an actuarial life table of a plurality of electrical devices corresponding to defined parameters of the tested electrical device; and
outputting the probability of failure.

23. A system comprising:
a database having client information and control information stored therein, wherein the client information includes a separate client class containing data corresponding to each of a plurality of clients and the control information includes at least one control class containing data corresponding to a combination of the plurality of clients;
a computing device having a processor coupled to the database, a memory coupled to the processor, and a plurality of instructions stored in the memory and executable by the processor, the instructions including instructions for:
receiving, by the system, test data representing an attribute of a tested electrical device;
classifying the received test data as belonging to a first client of the plurality of clients, adding the received data to the first client's client class, and adding the received test data to the control class;
processing the received test data using one of a sparse data process and an autoregressive process to obtain a first derivative and a second derivative representing the received test data;
determining a position of the attribute relative to control information representing information corresponding to the attribute for a plurality of electrical devices, wherein the determining is based on the first derivative and the second derivative; and
outputting at least a representation of a future value of the position.

24. The system of claim 23 further comprising instructions for:
determining whether the attribute of the tested electrical device is represented in the system by only the received test data, by only two sets of test data that include the received test data and stored test data corresponding to the attribute from at least one previous test, or by three or more sets of test data that include the received test data and stored test data corresponding to the attribute from at least two previous tests;
storing the received test data if the attribute is represented in the system by only the received test data, wherein the received test data is not analyzed;
processing the received test data using the sparse data process if the attribute is represented in the system by two sets of test data; and
processing the received test data using the autoregressive process if the attribute is represented in the system by three or more sets of test data.

25. The system of claim 24 wherein the instructions for processing the received test data using the sparse data process further comprise instructions for:
calculating a first derivative for the received test data;
placing the calculated first derivative into one of a plurality of bands, wherein the bands represent non-overlapping ranges of first derivative values from the control set, and wherein each band is associated with an average second derivative;
assigning the average second derivative of the band into which the calculated first derivative was placed to the received test data, where the future value of the position is based on the calculated first derivative and the assigned average second derivative.

26. The system of claim 24 wherein the instructions for processing the received test data using the autoregressive process further comprise instructions for:
determining a set of individual parameters for the tested electrical device based on the received test data, wherein the individual parameters are based on information corresponding to the tested electrical device;
determining a set of client class parameters based on the received test data, wherein the client class parameters are based on information corresponding to all electrical devices of the first client that correspond to defined parameters of the tested electrical device;
determining a set of control class parameters based on the received test data, wherein the control class parameters are based on information corresponding to all electrical devices of the plurality of clients that correspond to defined parameters of the tested electrical device; and
performing a credibility weighting to determine a standard minimum variance between the client class parameters and the control class parameters.

* * * * *